T. H. PARKER.
CENTRIFUGAL SEPARATOR.
APPLICATION FILED JUNE 9, 1917.
Reissued July 24, 1917. 14,331.
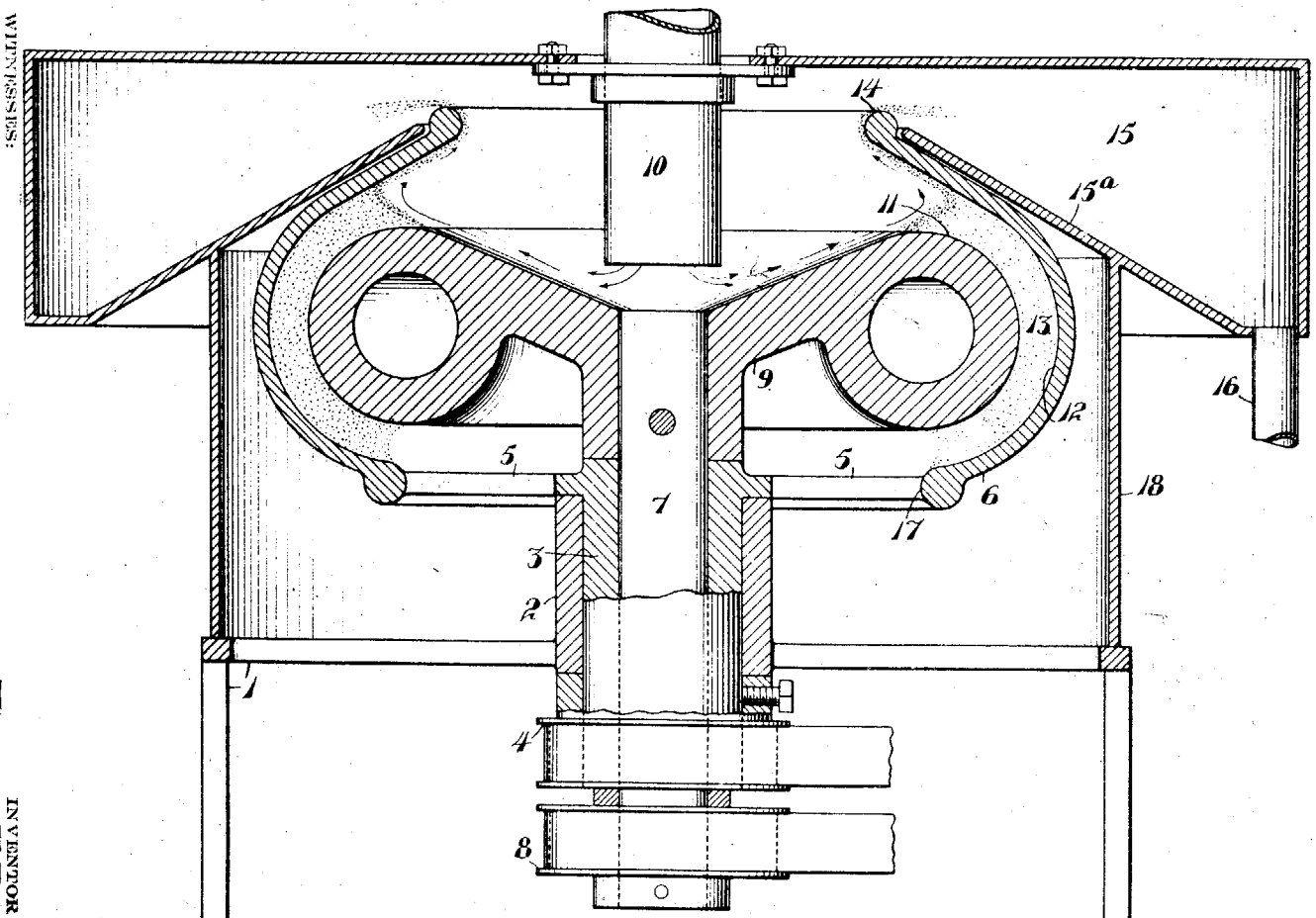
WITNESSES:
F. C. Fliedner
Arthur C. Berresch
INVENTOR
*Thomas H. Parker,*
BY *Strong & Townsend*
ATTORNEYS

UNITED STATES PATENT OFFICE.

THOMAS HARRY PARKER, OF SAN FRANCISCO, CALIFORNIA.

CENTRIFUGAL SEPARATOR.

14,331. Specification of Reissued Letters Patent. Reissued July 24, 1917.

Original No. 1,212,996, dated January 16, 1917, Serial No. 89,808, filed April 8, 1916. Application for reissue filed June 9, 1917. Serial No. 173,893.

*To all whom it may concern:*

Be it known that I, THOMAS HARRY PARKER, a citizen of the United States, residing at the city and county of San Francisco and State of California, have invented new and useful Improvements in Centrifugal Separators, of which the following is a specification.

My invention relates to improvements in centrifugal separators; and has for its object to provide a continuous separating apparatus for the purpose of separating substances of different specific weights from solutions or mixtures.

One form which my invention may assume is exemplified in the following description and illustrated in the accompanying drawing, wherein I have shown the device embodied in a dewatering device for metallurgical pulp.

The figure is a central vertical section of my apparatus.

In the drawing, 1 indicates a base or support for a bearing 2, in which can rotate a sleeve 3 carrying at its lower end a pulley 4, and said sleeve carries at its upper end by means of webs 5 a circular, concaved shell 6 rotatable with said sleeve 3. Within said sleeve 3 is a shaft 7, rotatable within said sleeve, and which shaft carries at its lower end a pulley 8 and at its upper end a centrifugal distributer 9. The solution carrying fine particles of sand or sediment of any kind is fed from a pipe 10 to the center of said distributer 9, and as said distributer rotates it carries the sediment to its outer curved periphery 11, where the same will be held between such periphery and the surrounding curved wall 12 of the shell 6.

When the space between walls 6 and 11 is filled up with sediment, as shown at 13, the water or valuable light particles will flow over the upper edge 14 of the shell 6 and into an upper cylinder or receptacle 15 supported on a cylindrical housing 18 and having an inclined bottom 15[a] surrounding the upper portion of the shell and a discharge pipe 16. The sediment will be forced out beneath the lower edge 17 of the shell 6 and be discharged within a lower cylindrical housing 18, from which it may be carried off by any suitable means. The said shell 6 and the distributer 9 are arranged so as to be rotatable at different speeds by any suitable means so as to prevent the sediment from packing between them. The fine particles of sediment cannot work back with the centripetal force, but the clear solution only is able to pass over the rim 14. When the sediment in the upper part of the semicircular passage becomes larger in volume than the sediment in the lower half thereof, there tends to be a movement of the entire mass in a downward direction, and this movement forces some of the sediment out of the lower end of said passage and thence into the lower chamber 18. The said movement continues at intervals while the apparatus is in operation. The discharge pipe 10 is supported centrally in the receptacle 15, as shown. The part of the apparatus shown centrally divided in the drawing corresponds to the other part thereof not shown, said apparatus being preferably circular in form. The upper portion of the distributer is provided with a central depression, as shown in the drawing. Belts for the operation of the pulleys are shown thereon.

In operation, pulp or other material to be separated is fed to the distributer through the pipe 10 and the said distributer is rotated at a sufficiently high speed to cause the material to be discharged radially outward against the concaved shell. The said shell is also rotated but at a slightly different speed. The first effect will be for the material to fill the concavity of the shell, and owing to the shape of the latter a sufficient mass of heavy particles will be retained therein to fill the space between the shell and periphery of the distributer. Centrifugal force will move the heavier particles outwardly against the walls of the shell, while the lighter particles will remain toward the inside, and as the feed of the material continues the lighter particles will be forced upwardly over the rim 14 of the shell while the heavier particles will pass out at the bottom of the shell.

None of the light particles can escape below the distributer on account of the seal formed by the mass of heavy particles between the periphery of the disk and the shell, at the same time the heavy particles cannot escape above on account of the inwardly projecting rim 14. The pressure of the lighter particles against the heavier, aided by gravity, will insure the discharge of the heavy particles at the bottom of the shell.

The periphery 11 of the distributer is in the form of an arc and the shell is made arcuate also, being struck from the same center as the periphery 11. The effect is to produce a space between of uniform width throughout its length and rounded. Therefore there is no tendency for the heavy particles to clog and become packed as when the space is made varying in cross section or contains sharp angles. The clogging and packing of the heavy particles in the space between the periphery of the distributer and the shell, particularly when handling sand and granular particles, as in metallurgical pulp, present a considerable problem. The shape and form of this space and the differential speeds of the distributer and shell offer a solution.

Having thus described my invention, what I claim and desire to secure by Letters Patent is—

1. In a centrifugal separator, a rotatable distributer having a central depression, a shaft carrying said distributer and driving the same, a shell projecting over and surrounding said distributer and provided with an upper open end and a lower open end, a rotatable sleeve carrying said shell and journaled upon said shaft, a receptacle having a downwardly inclined bottom surrounding the upper portion of said shell and provided with a discharge aperture in its bottom, and a casing surrounding said shell and sleeve.

2. In a centrifugal separator, a distributer having a central inclined depression, a shaft carrying said distributer and driving the same, a shell projecting over and surrounding said distributer having openings in its upper and lower ends, a rotatable sleeve journaled upon said shaft and carrying the shell, a receptacle having a downwardly inclined bottom surrounding the upper portion of said shell and provided with a discharge aperture in its bottom, said inclined bottom terminating adjacent to and in line with the upper rim of the shell, a casing surrounding said shell and sleeve, and a supply pipe extending downwardly through said receptacle and terminating in proximity to the center of the distributer.

3. In a centrifugal separator, a rotatable distributer carried on a vertical axis and discharging the material radially outward, and a rotatable concaved shell surrounding the distributer and receiving the material therefrom, said shell having open-ended walls projecting above and below the distributer and capable in operation of discharging the light particles over the top edge and the heavy particles below it.

4. In a centrifugal separator, a rotatable distributer carried on a vertical axis and discharging the material radially outward, a rotatable concaved shell surrounding the distributer and receiving the material therefrom, said shell having open-ended walls projecting above and below the distributer and capable in operation of discharging the light particles over the top edge and the heavy particles below it, and means for maintaining a seal of heavy particles between the distributer and shell, whereby the light particles are prevented from passing downwardly.

5. In a centrifugal separator, a rotatable distributer carried on a vertical axis and discharging the material radially outward, and a rotatable concaved shell surrounding the distributer and receiving the material therefrom, said shell having open-ended walls projecting above and below the distributer and capable in operation of discharging the light particles over the top edge and the heavy particles below it, said distributer having a concaved upper face.

6. In a centrifugal separator, a rotatable distributer carried on a vertical axis and discharging the material radially outward, a rotatable concaved shell surrounding the distributer and receiving the material therefrom, said shell having open-ended walls projecting above and below the distributer and capable in operation of discharging the light particles over the top edge and the heavy particles below it, said distributer having a concaved upper face, and means for supplying material to said distributer from a point above and adjacent to the center of the same.

7. In a centrifugal separator, a rotatable distributer carried on a vertical axis and discharging the material radially outward, and a rotatable concaved shell surrounding the distributer and receiving the material therefrom, said shell having open-ended walls projecting above and below the distributer and capable in operation of discharging the light particles over the top edge and the heavy particles below it, said concaved shell having its upper portion extended inwardly farther than the lower portion.

8. In a centrifugal separator, a rotatable distributer carried on a vertical axis and discharging the material radially outward, a rotatable concaved shell surrounding the distributer and receiving the material therefrom, said shell having open-ended walls projecting above and below the distributer and capable in operation of discharging the light particles over the top edge and the heavy particles below it, and a receptacle or launder for the light material formed with a stationary inclined bottom surrounding the upper portion of the shell.

9. In a centrifugal separator, a rotatable distributer carried on a vertical axis and discharging the material radially outward, and a rotatable concaved shell surrounding the distributer and receiving the material therefrom, said shell having open-ended walls projecting above and below the distributer and capable in operation of discharging the light particles over the top edge and the heavy particles below it, said shell and distributer being spaced from each other and disconnected.

10. In a centrifugal separator, a rotatable distributer carried on a vertical axis and discharging the material radially outward, a rotatable concaved shell surrounding the distributer and receiving the material therefrom, said shell having open-ended walls projecting above and below the distributer and capable in operation of discharging the light particles over the top edge and the heavy particles below it, said shell and distributer being spaced from each other and disconnected, and separate driving means for the shell and distributer.

11. In a centrifugal separator, a rotatable distributer carried on a vertical axis and discharging the material radially outward, a rotatable concaved shell surrounding the distributer and receiving the material therefrom, said shell having open-ended walls projecting above and below the distributer and capable in operation of discharging the light particles over the top edge and the heavy particles below it, said shell and distributer being spaced from each other and disconnected, and means for driving the shell and distributer at slightly different speeds.

12. In a centrifugal separator, a rotatable distributer carried on a vertical axis and discharging the material radially outward, and a rotatable concaved shell surrounding the distributer and receiving the material therefrom, said shell having open-ended walls projecting above and below the distributer and capable in operation of discharging the light particles over the top edge and the heavy particles below it, said distributer having a downwardly curved periphery in the form of an arc and the portion of the shell adjacent to said periphery being also made arcuate, the axes of curvature of both being coincident.

THOMAS HARRY PARKER.

Witnesses:
JOHN H. HERRING,
G. M. BALL.